United States Patent [19]
Igarashi

[11] Patent Number: 5,452,377
[45] Date of Patent: Sep. 19, 1995

[54] MOVING VECTOR DETECTING DEVICE

[75] Inventor: Katsuji Igarashi, Tokyo, Japan

[73] Assignee: Sony Corporation, Tokyo, Japan

[21] Appl. No.: 861,583

[22] Filed: Apr. 1, 1992

[30] Foreign Application Priority Data

Apr. 12, 1991 [JP] Japan .................. 3-108816

[51] Int. Cl.⁶ .................. G06K 9/36; H04N 5/917; H04N 7/32
[52] U.S. Cl. .................. 382/238; 348/415
[58] Field of Search .................. 382/56; 358/133, 135, 358/136, 105

[56] References Cited

U.S. PATENT DOCUMENTS

| | | | |
|---|---|---|---|
| 4,777,530 | 10/1988 | Kondo | 358/160 |
| 4,924,305 | 5/1990 | Nakagawa et al. | 358/105 |
| 4,937,666 | 6/1990 | Yang | 358/136 |
| 5,047,850 | 9/1991 | Ishii et al. | 358/105 |
| 5,068,726 | 11/1991 | Kondo et al. | 358/135 |
| 5,111,511 | 5/1992 | Ishii et al. | 382/1 |
| 5,157,732 | 10/1992 | Ishii et al. | 382/1 |
| 5,173,771 | 12/1992 | Kitazato | 358/105 |

FOREIGN PATENT DOCUMENTS 407273  6/1990  European Pat. Off. .

OTHER PUBLICATIONS

IEEE Transactions on Circuits and Systems, vol. 33, No. 2, Feb. 1986, pp. 250–259 (Fortier).
IEEE Transactions on Broadcating, vol. 36, No. 4, Dec. 1990, pp. 245–254 (Paik).
IEEE Transactions on Communications, vol. 38, No. 7, Jul. 1990, pp. 950–953, (Ghanbari).

Primary Examiner—Leo H. Boudreau
Assistant Examiner—Christopher S. Kelley
Attorney, Agent, or Firm—Jay H. Maioli

[57] ABSTRACT

A motion vector detecting apparatus using the minimum residual difference between corresponding picture elements from two consecutive frames and an interpolation circuit to develop a moving vector with half-picture-element pitch accuracy. A residual difference is obtained by comparing each frame of an image signal fed into the apparatus with each previous frame. A solution vector is obtained by taking the minimum value of the absolute values of the residual differences. The solution vector is adjusted by a correction value, which is determined by interpolating extreme values in the vicinity of this solution vector and taking a minimum therefrom, to obtain the half-picture-element pitch solution vector.

6 Claims, 4 Drawing Sheets

1

MOVING VECTOR DETECTING DEVICE

BACKGROUND OF THE INVENTION

1. Field of the Invention

This invention relates to a moving vector detecting device which is used for highly efficient coding of a moving picture and, more particularly, to the development of a moving vector with half-picture-element pitch accuracy.

2. Description of the Prior Art

For highly efficient coding of a moving picture, a system for performing DCT conversion (Discrete Cosine Transform) of a difference of picture element data between frames and for variable-length-coding of an output of the DCT conversion has been proposed. To efficiently compress the moving picture, a moving vector detector is provided, and a detected moving vector is transmitted. Also, to develop an interframe difference, a local decoder for developing a prediction value of a prevision frame is provided. The detected moving vector is fed to this local decoder.

An example a method for moving vector detection is block matching. FIG. 1A shows a block BL0 formed of many (3×3) blocks obtained by the division of a picture of a previous frame. Picture element data of B11, B12, ..., B33 is contained in the block BL0. FIG. 1B shows a block AL0 which includes picture element data A11, A12, ..., A33 in a picture of the present frame and from which a moving vector is to be obtained. Within a range of search for the moving vector, the position of the block AL0 of the present frame is predicted from the previous frame.

First, an absolute value (ABS) (called "residual difference"), which is a difference of value of picture elements of corresponding positions between two frames in terms of time, is calculated. Then residual difference for each element is added for every block and a total sum $\Delta F$ of the residual differences is obtained.

$$\Delta F = ABS\{(A11-B11)+(A12-B12)+\ldots +(A33-B33)\}$$

Plural total sums $\Delta F$ of the residual differences are obtained in the range of search of a moving vector. A minimum value of the plural $\Delta F$ is detected, and a position (x, y) of the minimum value is detected as the moving vector. The moving vector (x, y) is the resolving power of the distance (one-picture-element pitch) between picture elements.

In the above-described highly efficient coding method, the higher the accuracy of the moving vector, the lower the distortion of coding. As a result, it has been proposed that the moving vector be detected with the accuracy of a half pitch of one picture element (called "half-picture-element pitch"). This means that a prediction block is formed by calculating the average value of two or four points and block matching processing is done with respect to the prediction block.

More specifically, assuming that a corresponding block in a previous frame, which is obtained with the one-picture-element pitch, is BL0, the following prediction blocks, which are shifted by the half-picture-element pitch, are obtained by the calculation of an average between BL0 and a block shifted by the one-picture-element with respect to BL0:

prediction block BL1 of (x+0.5, y);

prediction block BL2 of {(B11 to B33)+(B12 to B34)}/2 (x−0.5, y);

prediction block BL3 of {(B11 to B33)+(B10 to B32)}/2 (x+0.5, y+0.5);

prediction block BL4 of {(B11 to B33)+(B10 to B32)+(B20 to B42)+(B21 to B43)}/4 (x−0.5, y+0.5);

prediction block BL5 of {(B11 to B33)+(B12 to B34)+(B01 to B23)+(B02 to B24)}/4 (x+0.5, y−0.5);

prediction block BL6 of {(B11 to B33)+(B10 to B32)+(B01 to B23)+(B00 to B22)}/4 (x−0.5, y−0.5);

prediction block BL7 of {(B11 to B33)+(B21 to B43)}/2 (x, y+0.5);

prediction block BL8 of {(B11 to B33)+(B01 to B23)}/2 (x, y−0.5);

By detecting a prediction block Bi whose sum of absolute values of differences between a present frame block AL0 and a prediction block BLi (i=0, 1, 2, ..., 8) takes a minimum value, a vector corresponding to this detected prediction block Bi will have a half-picture-element-pitch accuracy. By examining the calculation amount by a method for obtaining such a moving vector of the half-picture-element pitch, the following is understood.

Now, assuming that the size of one block is (N×N), the amount of calculations after obtaining the moving vector of the one-picture-element pitch is examined. First, the calculations of prediction blocks are limited to only additions. As a result, (Additions for prediction of two-point average)+(Additions for prediction of four-point average)=$4N^2+6\times 2N^2=16N^2$ To obtain an absolute value of a difference, the subtractions of $4N^2$ and the generation of the absolute values of $4N^2$ are needed for each prediction of each two-point average and the prediction of the four-point average. Therefore, (Subtractions)+(Absolute value generation)=$(8N^2)+(8N^2)=16N^2$.

OBJECTS AND SUMMARY OF THE INVENTION

An object of the invention is, therefore, to provide a moving vector detecting device capable of detecting a moving vector of the half-picture-element pitch with reduced calculations as compared with the prior art system.

According to an aspect of the invention, there is provided a motion vector detecting apparatus comprising an image receiving part for receiving image signals of two consecutive frames in terms of time; a subtracting circuit for obtaining a difference of value of picture element at corresponding positions between the two frames; an absolute value circuit for obtaining a residual difference which is an absolute value of a signal which is output from the subtracting circuit; a solution vector detecting circuit for dividing the image signal into a plurality of blocks and processing the image signal and for summing the residual difference for every block and for obtaining a solution vector of the block with one-picture-element-pitch accuracy from a minimum value a of the sum value; predicting circuit for predicting an extreme value of a half-picture-element pitch in each of plural directions interpolating using the residual differences in the vicinity of the solution vector of the one-picture-element pitch; a correction value circuit for detecting a minimum value of the extreme values and developing a correction value corresponding to the minimum value; and a vector circuit for developing an output vector which is equal to the solution of the one-picture-element pitch added by the correction value.

The above, and other objects, features and advantages of the present invention will become readily apparent from the following detailed description thereof which is to be read in connection with the accompanying drawings.

DETAILED DESCRIPTION OF THE PREFERRED EMBODIMENTS

Figure 1A:
FIGS. 1A and 1B are presentations showing the detection of conventional moving vector.
Figure 1B:
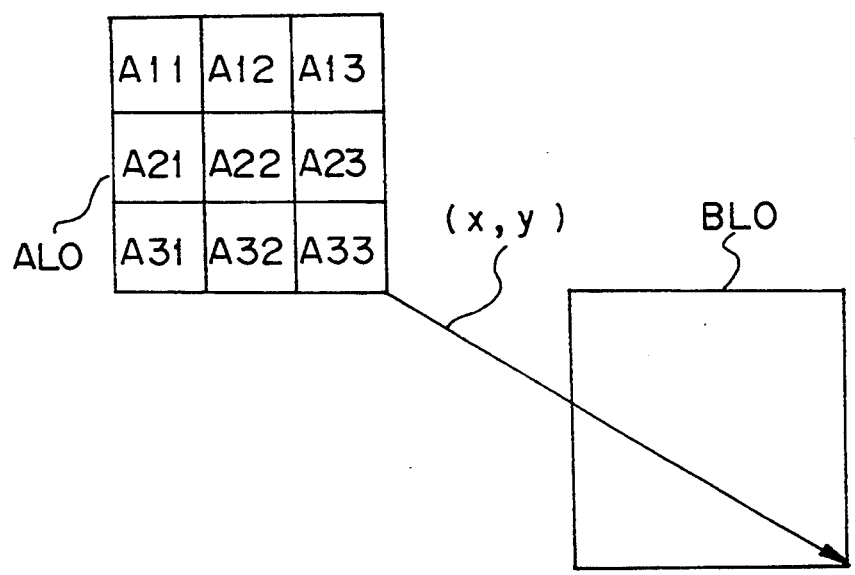

Hereunder, one embodiment of this invention will be described referring to the drawings. Moving vector detection of this invention is done as follows. By interpolating and supposing extreme values of the half-picture-element pitch in plural directions from residual differences in the vicinity of a solution vector obtained with the picture-element pitch and by adding a minimum value of the extreme values as a correction value to the solution vector of the one-picture-element pitch, a moving vector of half-picture-element pitch accuracy is obtained.

Figure 2:
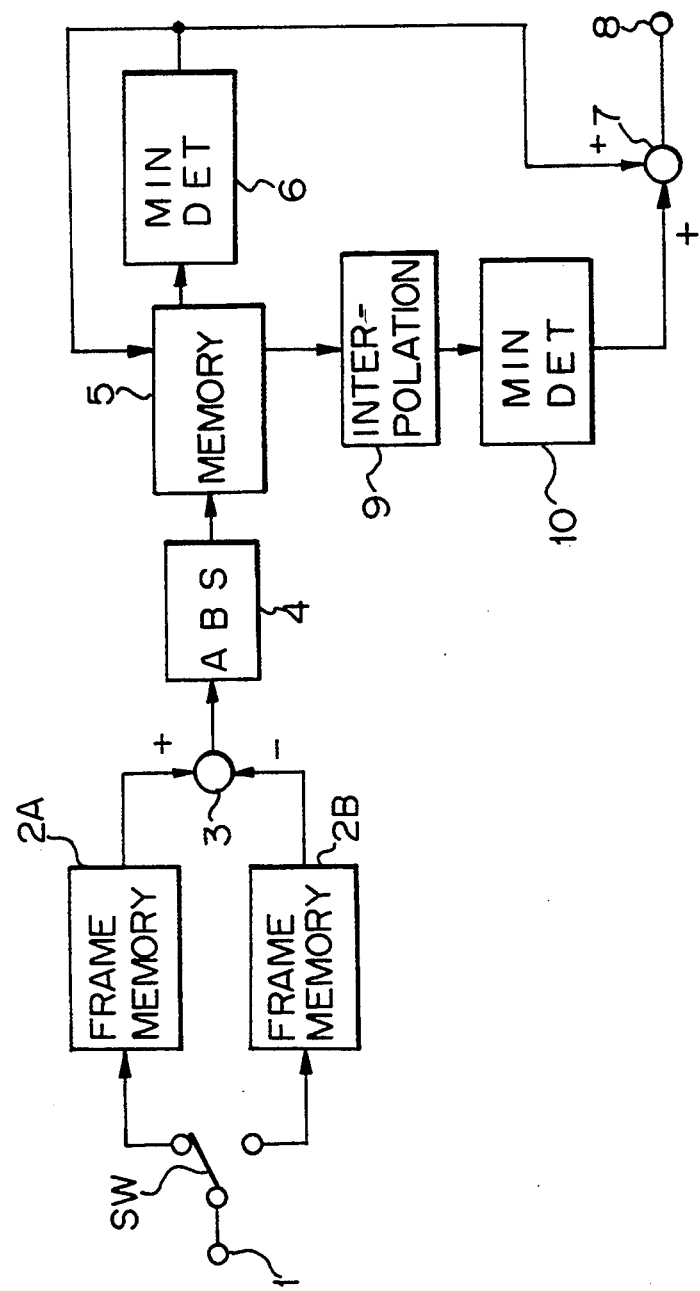
FIG. 2 is a block diagram of one embodiment of this invention.

FIG. 2 shows a block diagram of one embodiment of the invention. Digital video data is input to an input terminal indicated at 1. Each frame of the input video data is stored into frame memories 2A and 2B alternately by a switching circuit SW. Picture element data read out respectively from a previous frame stored in the frame memory 2A and from a present frame stored in the frame memory 2B is supplied to a subtracting circuit 3.

A frame difference for every picture element from the subtracting circuit 3 is given to an absolute value generating circuit 4 to be converted into an absolute value. The absolute value of the frame difference, that is, the residual difference is stored in a memory 5. The residual difference stored in the memory 5 is supplied to a minimum value detecting circuit 6. At the minimum value detecting circuit 6, a solution vector having the one-picture-element pitch is detected through block matching. This method is like the detection of a moving vector by conventional block matching. Assuming that the range of moving search covers M longitudinally and laterally, a minimum value among residual differences in the range of (−M, −M) position to (+M, +M) is detected as a solution vector. The solution vector is supplied to the memory 5 and an adder 7.

Figure 3:
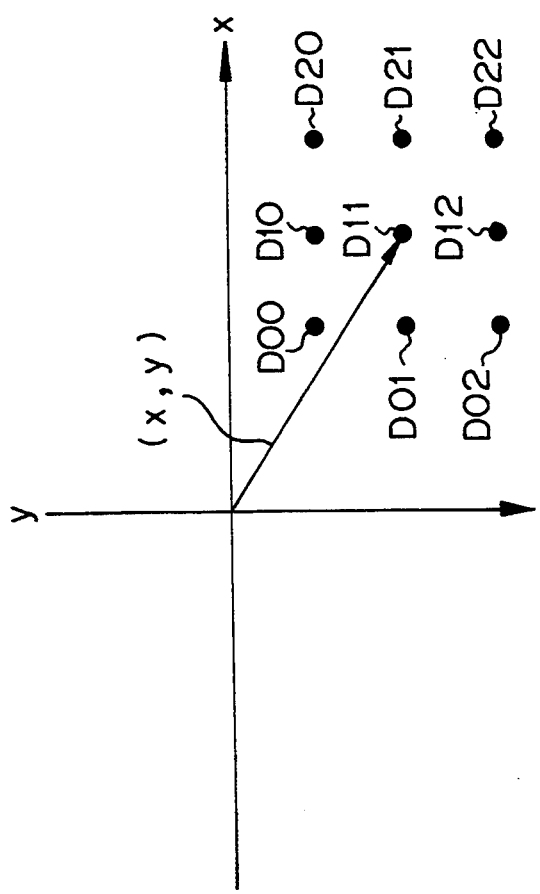
FIG. 3 is a schematic diagram for explaining an operation of one embodiment of this invention.

Plural residual difference in the vicinity of the above-stated solution vector are read out of the memory 5. FIG. 3 shows (3×3=9) residual differences D00 to D22 centered at the solution vector (x, y). The residual differences D00 to D22 are given to an interpolating circuit 9, and the interpolating circuit 9 predicts extreme values on four directions.

Figure 4A:
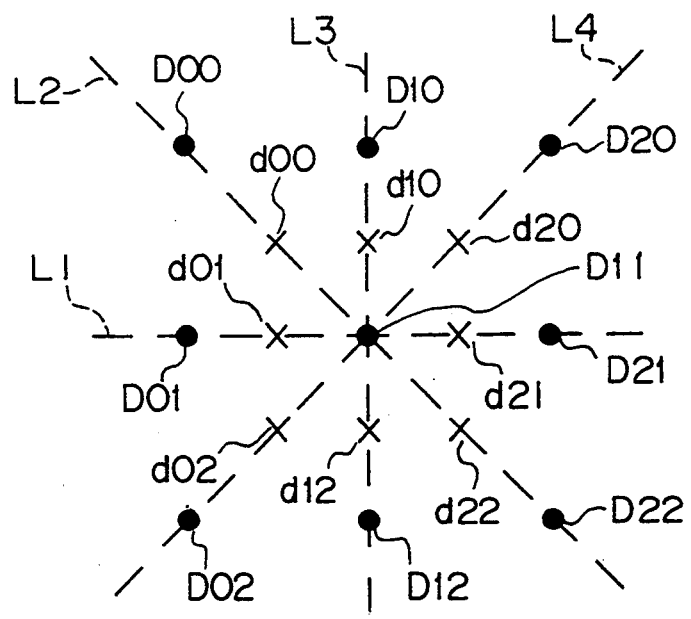
FIGS. 4A and 4B are schematic diagram for explaining an operation of one embodiment of this invention.
Figure 4B:
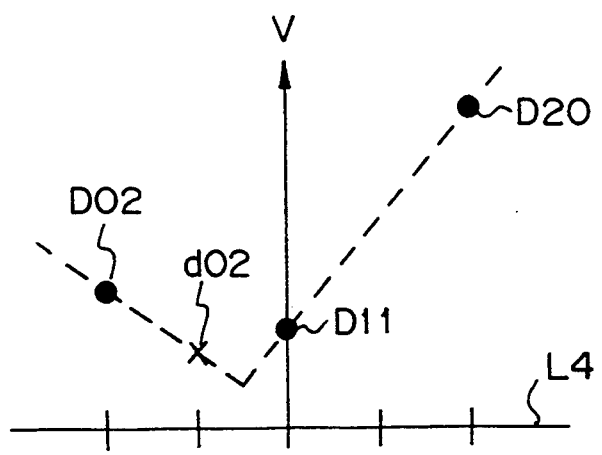

An operation of the interpolating circuit 9 will be described referring to FIG. 4. In FIG. 4A, L1, L2, L3, and L4, respectively, represent interpolation directions in the lateral direction, longitudinal directions and oblique direction. For example, with respect to the oblique direction L4, the residual differences D02, D11, and D20 are present. As shown in FIG. 4B where the lateral axis is the position of the L4 direction and the longitudinal axis is a value V, if D20>D02 is established, an extreme value d02 of the half-picture-element pitch in the direction L4 is assumed by an interpolation calculation of d02=D02−{(D20−D11)/2}. If D20≦D02 is established, an extreme value d20 of the half-picture-element pitch in the direction L4 is assumed by an interpolation calculation. By similarly performing V-letter-like interpolation calculations as shown in FIG. 4B with respect to the other directions L1, L2, and L3, extreme values assumed with respect to each direction are detected.

The four extreme values of the half-picture-element pitch presumed by the interpolating circuit 9 are supplied to a minimum value detecting circuit 10. The minimum value detecting circuit 10 detects the minimum value of the four extreme values by the comparison of magnitude and adopts a value corresponding to the minimum value as a correction value of the half-picture-element pitch when the detected extreme value is smaller than D11. If the detected extreme value is larger than D11, no correction value is generated (Namely, the correction value is zero). As one example, d00, d01, d02, and d10 in FIG. 4A are presumed as extreme values by the interpolating circuit 9, and d00 is detected as the minimum value by the minimum value detecting circuit 10. Further, in the case of d00<D11, (−0.5, −0.5) is developed as the correction value.

From the minimum value detecting circuit 10, the correction value is supplied to the adder 7. In the adder 7, the correction value is added to the solution vector (x, y) of the picture element pitch, and a moving vector of the half-picture-element pitch can be provided at an output terminal 8. In this embodiment, four comparisons of values, eight subtractions and division by four shifts, and minimum value judgement processing enable calculating the moving vector of the half-picture-element pitch with respect to one block.

To obtain a solution vector of the one-picture-element pitch, various measures for reducing the calculation amount (for example, a three-stage search method) may be employed. Also, an interpolation method for obtaining extreme values in plural directions by the use of residual differences in the vicinity of the solution vector is not limited to the one described in the above-mentioned embodiment.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A motion vector detecting apparatus comprising:
   image receiving means including a frame memory for receiving and storing video image signals of two consecutive frames of picture elements;

a subtracting circuit connected to said image receiving means for obtaining a difference signal representative of a difference value of respective picture elements at corresponding positions between said two frames;

an absolute value circuit connected to said subtracting circuit for obtaining a residual difference signal formed of an absolute value of a signal output from said subtracting circuit, said signal output from said subtracting circuit representing the difference value of respective picture elements at corresponding positions between said two frames;

a solution vector detecting circuit including a residual difference memory for dividing an output signal from said absolute value circuit representing the absolute value of the difference value of respective picture elements at corresponding positions between said two frames into a plurality of blocks of difference values of respective picture elements and for summing residual difference signals stored in said residual difference memory for each block and obtaining a solution vector of said block with one-picture-element pitch accuracy from a minimum value of the summed values;

a predicting circuit for predicting an extreme value of a half-picture-element pitch in each of eight equally spaced directions by interpolating said residual difference signals in a vicinity of said solution vector of said one-picture-element pitch;

a correction value circuit connected to said predicting circuit for detecting a minimum value of said extreme values and developing a correction value corresponding to said detected minimum value; and a vector signal generating circuit connected to said correction value circuit and to said solution vector detecting circuit for developing an output vector signal which is equal to said solution vector of said one-picture-element pitch added to said correction value.

2. A motion vector detecting apparatus according to claim 1, wherein said image signals are video signals in a digital format.

3. A motion vector detecting apparatus according to claim 2, wherein said image signals of two frames supplied to said subtracting circuit are an image signal of a previous frame and an image signal of a present frame which are obtained from said memory.

4. A motion vector detecting apparatus according to claim 1, wherein said solution vector detecting circuit divides an image signal of one frame into a plurality of blocks to perform block matching and calculates said solution vector for every range of a predetermined search range.

5. A motion vector detecting apparatus according to claim 1, wherein said predicting circuit includes means for interpolating said extreme values of said half-picture-element pitch in each of eight equally spaced directions from said residual differences in said vicinity of said solution vector.

6. A motion vector detecting apparatus according to claim 5, wherein said means for interpolating perform interpolation by averaging a center value of said solution vector and the greatest residual difference of that solution vector and by subtracting the averaged value from the lowest residual difference of that solution vector.

* * * * *